United States Patent
Wang et al.

(10) Patent No.: US 12,498,035 B2
(45) Date of Patent: Dec. 16, 2025

(54) GEARBOX, ELECTRIC DRIVE ASSEMBLY SYSTEM AND VEHICLE

(71) Applicant: Valeo eAutomotive Germany GmbH, Erlangen (DE)

(72) Inventors: Wenhui Wang, Erlangen (DE); Yejin Jin, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 7 days.

(21) Appl. No.: 18/450,184

(22) Filed: Aug. 15, 2023

(65) Prior Publication Data

US 2024/0060558 A1    Feb. 22, 2024

(30) Foreign Application Priority Data

Aug. 16, 2022    (CN) .......................... 202210981889.0

(51) Int. Cl.
  *F16H 57/04*    (2010.01)
  *F16H 57/02*    (2012.01)
  *F16H 57/023*    (2012.01)

(52) U.S. Cl.
  CPC ......... *F16H 57/0423* (2013.01); *F16H 57/02* (2013.01); *F16H 57/023* (2013.01); *F16H 57/0409* (2013.01); *F16H 57/045* (2013.01)

(58) Field of Classification Search
  CPC .... F16H 57/02; F16H 57/023; F16H 57/0409; F16H 57/0423; F16H 57/045; F16H 57/0543
  See application file for complete search history.

(56) References Cited

U.S. PATENT DOCUMENTS

| | | | |
|---|---|---|---|
| 11,028,917 B1* | 6/2021 | Chapman | ............ F16H 57/0423 |
| 11,105,410 B2 | 8/2021 | Günel et al. | |
| 11,181,183 B2* | 11/2021 | Carson | .................... E02F 9/202 |
| 2005/0230215 A1* | 10/2005 | Kimura | ................ F16H 57/043 |
| | | | 192/48.8 |

(Continued)

FOREIGN PATENT DOCUMENTS

| | | |
|---|---|---|
| CN | 204114058 U | 1/2015 |
| CN | 110925404 A | 3/2020 |

(Continued)

OTHER PUBLICATIONS

He et al. (CN 215487569 U) English translation.*

(Continued)

*Primary Examiner* — Minh Truong
(74) *Attorney, Agent, or Firm* — Oblon, McClelland, Maier & Neustadt, L.L.P.

(57) ABSTRACT

A gearbox includes a housing, a first shaft, accommodated in the housing and having a first large gear, the first shaft rotating about a first rotation axis, the first rotation axis being substantially parallel to an axial direction of the gearbox. A second shaft is accommodated in the housing and has a second large gear, the second shaft rotating about a second rotation axis, the second rotation axis being substantially parallel to the axial direction of the gearbox. An oil isolation plate which, together with the housing, forms a lubricating oil holding space, the lubricating oil holding space being substantially isolated from the first large gear and the second large gear.

12 Claims, 5 Drawing Sheets

(56) References Cited

U.S. PATENT DOCUMENTS

| | | | | |
|---|---|---|---|---|
| 2006/0060424 | A1* | 3/2006 | Tominaga | F16H 57/0423 184/11.1 |
| 2006/0065487 | A1* | 3/2006 | Tominaga | F16H 57/05 184/6.12 |
| 2007/0151411 | A1* | 7/2007 | Suzuki | F16H 57/0494 74/606 R |
| 2010/0101351 | A1* | 4/2010 | Lafer | F16H 57/0421 74/467 |
| 2011/0271792 | A1* | 11/2011 | Rollins | F16H 57/0456 74/606 R |
| 2015/0204436 | A1* | 7/2015 | Mafune | F16H 57/0409 475/160 |
| 2017/0030457 | A1* | 2/2017 | Hotait | F16H 57/0463 |
| 2018/0238434 | A1* | 8/2018 | Zhang | F16H 57/0423 |
| 2019/0003570 | A1* | 1/2019 | Graves | F16H 57/0409 |
| 2020/0393039 | A1* | 12/2020 | Matsui | F16H 57/03 |
| 2021/0190200 | A1* | 6/2021 | Itou | F16H 55/17 |
| 2022/0250714 | A1 | 8/2022 | Kuramoto et al. | |

FOREIGN PATENT DOCUMENTS

| | | |
|---|---|---|
| CN | 210397663 U | 4/2020 |
| CN | 213899806 U | 8/2021 |
| CN | 214118913 U | 9/2021 |
| CN | 215487569 U * | 1/2022 |
| CN | 114370494 A | 4/2022 |
| DE | 10 2020 204 587 A1 | 11/2020 |
| JP | 3910251 B2 | 4/2007 |

OTHER PUBLICATIONS

Extended European Search Report issued Jan. 17, 2024, in corresponding European Patent Application No. 23188952.8, 9 pages.

* cited by examiner

GEARBOX, ELECTRIC DRIVE ASSEMBLY SYSTEM AND VEHICLE

TECHNICAL FIELD

The present disclosure relates to the field of gearboxes, in particular to a gearbox having a lubricating oil holding space substantially isolated from gears. The present disclosure further relates to an electric drive assembly system comprising such a gearbox, and a vehicle.

BACKGROUND

Gearboxes are generally installed in vehicles. A series of transmission components are accommodated in a housing of the gearbox, to transmit motive power from a motive power source to the wheels, driving the vehicle to advance. Once the gearbox has been installed in place in the vehicle, lubricating oil inside a casing of the gearbox for lubricating the transmission components will collect at the bottom of the casing. Rotation of gears in the gearbox will agitate the lubricating oil at the bottom of the casing, causing the lubricating oil to splash inside the gearbox and collect at the bottom of the casing again, forming a dynamic equilibrium. However, if the gears in the gearbox agitate too much lubricating oil, this will result in loss of energy (i.e. oil agitation loss), reducing the output power of the gearbox and lowering the transmission efficiency of the drive system. Due to constraints in the overall design of a vehicle, it is sometimes necessary to position multiple gears at the bottom of the gearbox, with the result that multiple gears agitate the lubricating oil simultaneously; moreover, one or more of these gears might have a high rotation speed, so the oil agitation loss is very significant, affecting the efficiency of motive power transmission. When the vehicle is an electric vehicle, such oil agitation loss will also cause a reduction in the electric vehicle's range.

SUMMARY

An objective of the present disclosure is to propose a gearbox to solve the technical problem mentioned above, the gearbox being designed so that lubricating oil deposited at the bottom of the gearbox is substantially isolated from gears, thus reducing the oil agitation loss of the gearbox.

A gearbox according to the present disclosure comprises: a housing; a first shaft, accommodated in the housing and having a first large gear, the first shaft rotating about a first rotation axis, the first rotation axis being substantially parallel to an axial direction of the gearbox; a second shaft, accommodated in the housing and having a second large gear, the second shaft rotating about a second rotation axis, the second rotation axis being substantially parallel to the axial direction of the gearbox; and an oil isolation plate which, together with the housing, forms a lubricating oil holding space, the lubricating oil holding space being substantially isolated from the first large gear and the second large gear.

In the present disclosure, the housing of the gearbox and the oil isolation plate cooperate to form the lubricating oil holding space, which is substantially isolated from the gears of the shafts in the gearbox. Thus, lubricating oil that collects in the lubricating oil holding space will not be agitated by the gears of the shafts, so the oil agitation loss is reduced, and the motive power transmission efficiency of the gearbox is increased.

The gearbox according to the present disclosure may also have one or more of the following features individually or in combination.

According to an embodiment of the present disclosure, the gearbox further comprises a third shaft, the third shaft being accommodated in the housing and having a first small gear, the third shaft rotating about a third rotation axis, the third rotation axis being substantially parallel to the axial direction of the gearbox. The first shaft further has a second small gear, the second small gear being rotationally fixed to the first large gear and offset with respect thereto in the axial direction, the first small gear is meshed with the first large gear, and the second small gear is meshed with the second large gear. The centre of the first shaft is arranged at a level below a line connecting the centre of the second shaft and the centre of the third shaft.

According to the abovementioned feature, the third shaft and second shaft of the gearbox are separately linked to the first shaft by gear meshing. The third shaft and second shaft may serve as an input shaft or output shaft of the gearbox; the first shaft may serve as an intermediate shaft of the gearbox. When the third shaft serves as the input shaft, the first small gear of the third shaft is meshed with the first large gear of the first shaft, the rotation speed of the first shaft being reduced in comparison with the third shaft, the second small gear of the first shaft is meshed with the second large gear of the second shaft, and the rotation speed of the second shaft serving as the output shaft is reduced in comparison with the first shaft, i.e. the gearbox is used as a gear speed reducer. When the second shaft serves as the input shaft, the second large gear of the second shaft is meshed with the second small gear of the first shaft, the rotation speed of the first shaft being increased in comparison with the second shaft, the first large gear of the first shaft is meshed with the first small gear of the third shaft, and the rotation speed of the third shaft serving as the output shaft is increased in comparison with the first shaft, i.e. the gearbox is used as a gear speed increaser.

According to an embodiment of the present disclosure, the oil isolation plate has a main body plate and a side extension part, the main body plate being substantially perpendicular to the axial direction of the gearbox, the main body plate isolating the lubricating oil holding space from the first large gear, the side extension part extending perpendicularly from the main body plate, and isolating the lubricating oil holding space from the second large gear.

According to the abovementioned feature, the main body plate and side extension part of the oil isolation plate respectively isolate the first large gear of the first shaft and the second large gear of the second shaft from the lubricating oil holding space.

According to an embodiment of the present disclosure, the oil isolation plate further has a bottom extension part, which extends perpendicularly from the bottom of the main body plate and is inserted between the first large gear and the housing, the bottom extension part having a contour along the circumference of the first large gear.

Regardless of whether the gearbox is used as a speed increaser or a speed reducer, the rotation speed of the first shaft serving as the intermediate shaft is increased by one step in comparison with the second shaft. If the gears of the first shaft were to contact the lubricating oil that collects at the bottom of the gearbox, the resulting oil agitation loss would be more significant; thus, the bottom extension part of the oil isolation plate further improves the isolation of the first large gear of the first shaft, minimizing the oil agitation loss.

According to an embodiment of the present disclosure, the side extension part has a contour along the circumference of the second large gear. That is to say, the side extension part has an arc-shaped contour which isolates the second large gear of the second shaft from the lubricating oil holding space.

According to an embodiment of the present disclosure, an upper edge of the main body plate is located above the lowest point of the circumference of the second small gear, and below a position where the second small gear meshes with the second large gear.

According to an embodiment of the present disclosure, the upper edge of the main body plate has a recess, the recess having a contour along the circumference of the second small gear.

The lubricating oil that collects at the bottom of the gearbox takes up a certain volume, forming a liquid surface of lubricating oil. The abovementioned structure enables the upper edge of the main body plate to be above the liquid surface of the lubricating oil, thus ensuring that lubricating oil does not overflow from the lubricating oil holding space.

According to an embodiment of the present disclosure, the first large gear of the first shaft and the lubricating oil holding space are offset with respect to each other in the axial direction, and isolated from each other by the main body plate of the oil isolation plate. The second large gear of the second shaft and the lubricating oil holding space substantially coincide in the axial direction, and are isolated from each other by the side extension part of the oil isolation plate.

According to the abovementioned feature, the first large gear of the first shaft and the lubricating oil holding space are isolated from each other by the main body plate of the oil isolation plate in the axial direction, whereas the second large gear of the second shaft and the lubricating oil holding space have substantially the same axial position, and are isolated from each other by the side extension part of the oil isolation plate in a direction perpendicular to the axial direction.

According to an embodiment of the present disclosure, the housing comprises a first half-housing and a second half-housing fitted together, the first half-housing being close to the first large gear in the axial direction, and the second half-housing being close to the second large gear in the axial direction.

According to an embodiment of the present disclosure, the first half-housing has a slope part positioned close to the first large gear, the slope part sloping downwards towards the lubricating oil holding space. When the oil isolation plate has a bottom extension part, the bottom extension part cooperates with the slope part to form an oil guide groove leading to the lubricating oil holding space. When the oil isolation plate is not provided with a bottom extension part, the oil isolation plate may comprise a protruding part which protrudes perpendicularly from the main body plate, the protruding part cooperating with the slope part to form an oil guide groove leading to the lubricating oil holding space. Lubricating oil can flow into the lubricating oil holding space via the oil guide groove.

According to an embodiment of the present disclosure, when the gearbox is running in a forward direction, at least a portion of lubricating oil splashing out from the first large gear of the first shaft falls onto the first half-housing, and is guided by the oil guide groove into the lubricating oil holding space; and when the gearbox is running in the forward direction, at least a portion of lubricating oil splashing out from the second large gear of the second shaft falls into the lubricating oil holding space.

Forward running of the gearbox corresponds to the vehicle advancing, and forms most of the operating state of the gearbox. According to the abovementioned feature, lubricating oil that is carried up by the first large gear of the first shaft and the second large gear of the second shaft and splashes out will return to the lubricating oil holding space, avoiding the risk of lubricating oil collecting outside the lubricating oil holding space and being agitated by the first large gear and second large gear.

According to an embodiment of the present disclosure, the second half-housing further comprises a filter mounting hole for mounting a filter, and the oil isolation plate further comprises a blocking part protruding parallel to the main body plate from an axial edge of the side extension part, the blocking part covering part of the filter mounting hole, so as to substantially isolate the filter mounting hole from the second large gear.

The filter can filter lubricating oil flowing therethrough. Lubricating oil in the lubricating oil holding space is sucked out from the gearbox through the filter, and returns to the gearbox after undergoing operations such as cooling. Thus, the lubricating oil in the lubricating oil holding space flows towards the filter mounting hole. The blocking part of the oil isolation plate can prevent the lubricating oil that is flowing towards the filter mounting hole from overflowing from the lubricating oil holding space.

According to an embodiment of the present disclosure, the main body plate of the oil isolation plate comprises two mounting holes, the oil isolation plate being fixed to the first half-housing by screws passing through the mounting hole.

The present disclosure further relates to an electric drive assembly system, comprising the gearbox described above.

The present disclosure further relates to a vehicle, comprising the electric drive assembly system mentioned above.

BRIEF DESCRIPTION OF THE DRAWINGS

To explain the technical solution of embodiments of the present disclosure more clearly, the drawings which need to be used in describing the embodiments are described in simple terms below. Obviously, the drawings in the description below are merely some embodiments of the present disclosure, and those skilled in the art could obtain other drawings based on these drawings without expending inventive effort. The drawings below have not been drawn by meticulously reducing or enlarging actual dimensions in equal proportion, but focus on showing the substance of the present disclosure.

In all of the drawings, identical or similar components are indicated with identical numerals.

DETAILED DESCRIPTION

Figure 1:
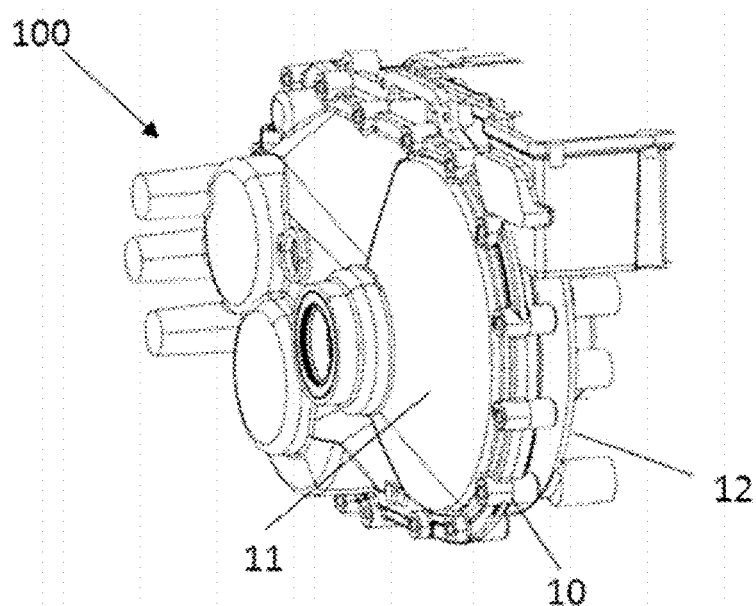
FIG. 1 is a perspective view of a gearbox according to an embodiment of the present disclosure.

In order to clarify the objective, technical solution and advantages of embodiments of the present disclosure, the technical solution of embodiments of the present disclosure is described clearly and completely below in conjunction with the drawings accompanying embodiments of the present disclosure.

Unless otherwise defined, technical terms or scientific terms used herein shall have the common meanings understood by those skilled in the art. "A", "one" or "the" and similar words used in the description and claims of the patent application of the present disclosure do not indicate a quantity limit, but mean that there is at least one. "Comprises" or "includes" and similar words mean that the element or object appearing before the word encompasses the elements or objects and their equivalents listed after the word, without excluding other elements or objects. "First", "second" and similar words used in the description and claims of the patent application of the present disclosure do not indicate any order, quantity or importance, being merely used to distinguish between different component parts. "Upper", "lower", "left", "right", etc. are only used to indicate a relative positional relationship, and when the absolute position of the described object changes, the relative positional relationship might also change accordingly.

Embodiments according to the present disclosure are described in detail with reference to the drawings. It must be noted here that in the drawings, identical reference numerals are assigned to component parts having substantially the same or similar structures and functions, and repeated descriptions of such component parts are omitted.

Figure 2:
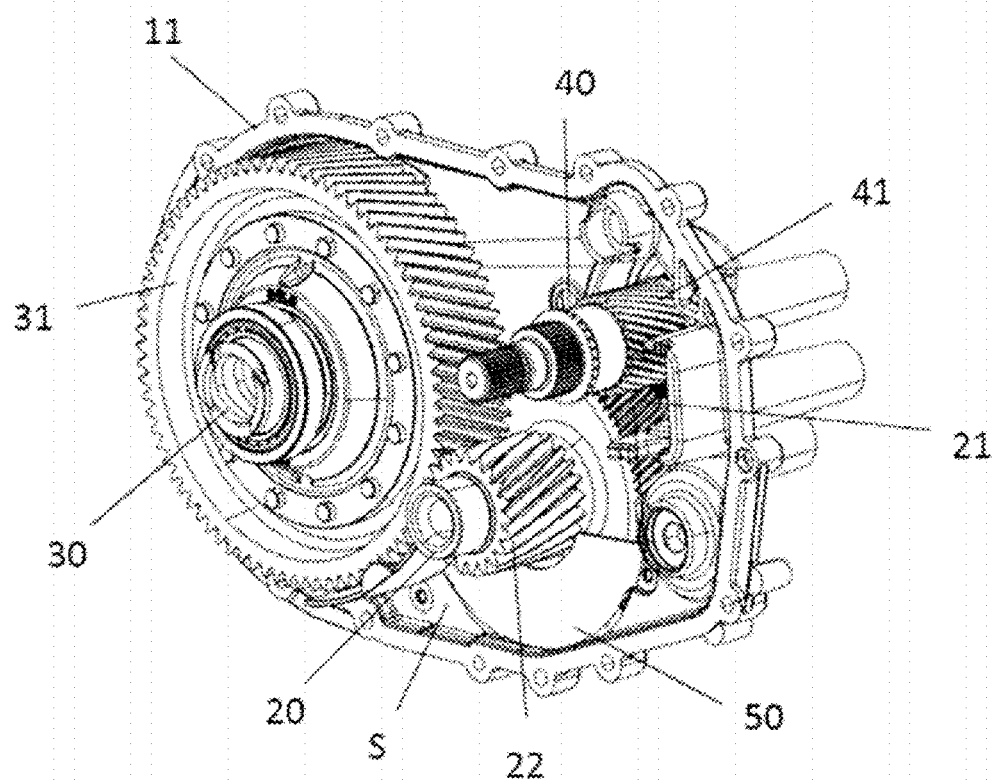
FIG. 2 shows the gearbox with the second half-housing of the housing removed.
Figure 3:
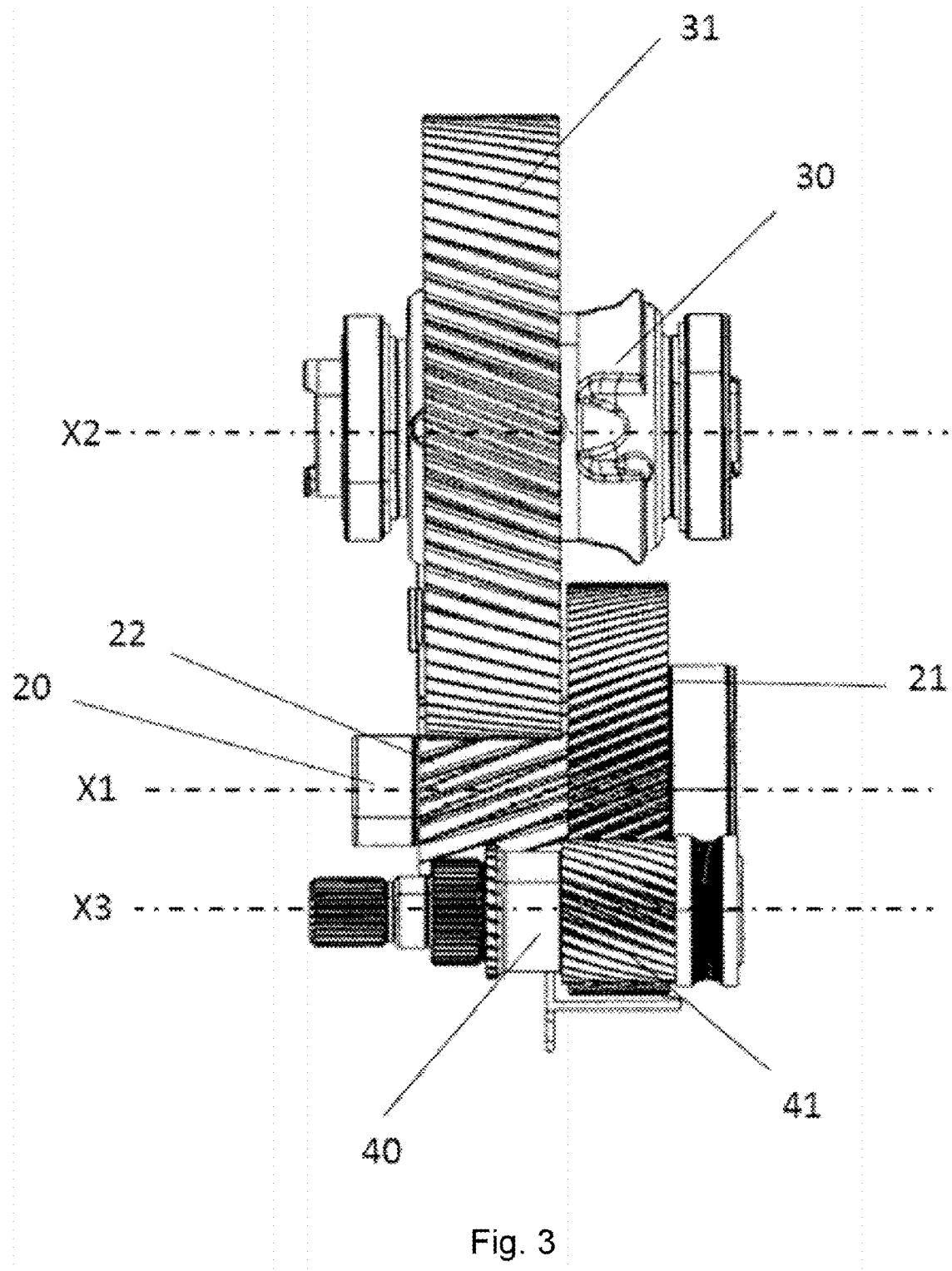
FIG. 3 shows a top view of the three shafts of the gearbox.

FIGS. 1-3 show a perspective view of the exterior of a gearbox 100, and a perspective view and a top view of internal components thereof.

As shown in the figures, the gearbox 100 comprises a housing 10 formed by fitting together a first half-housing 11 and a second half-housing 12; a first shaft 20, a second shaft 30 and a third shaft 40 arranged in the housing 10 as transmission components; and an oil isolation plate 50 which, together with the housing 10, forms a lubricating oil holding space S.

The first shaft 20 rotates about a first rotation axis X1, and has a first large gear 21 and a second small gear 22. The second shaft 30 rotates about a second rotation axis X2, and has a second large gear 31. The third shaft 40 rotates about a third rotation axis X3, and has a first small gear 41. The three rotation axes X1, X2 and X3 are substantially parallel to each other, and substantially parallel to an axial direction of the gearbox 100.

The first large gear 21 and second small gear 22 of the first shaft 20 are rotationally fixed, and offset in the axial direction of the gearbox 100. The second large gear 31 of the second shaft 30 is meshed with the second small gear 22 of the first shaft 20, and the axial positions of the two gears substantially coincide. The first small gear 41 of the third shaft 40 is meshed with the first large gear 21 of the first shaft 20, and the axial positions of the two gears substantially coincide. The first large gear 21 is close to the first half-housing 11 in the axial direction, and the second large gear 31 is close to the second half-housing 12 in the axial direction.

On a path of motive power transmission, depending on the objective, the second shaft 30 and third shaft 40 may each serve as an input shaft or an output shaft of the gearbox 100; the first shaft 20 is located between the second shaft 30 and the third shaft 40, and always serves as an intermediate shaft of the gearbox 100. Due the relationship between the meshed gears in terms of numbers of teeth, the third shaft 40 has the highest rotation speed among the three shafts of the gearbox 100, the second shaft 30 has the lowest rotation speed, and the rotation speed of the first shaft 20 is between the rotation speeds of the second and third shafts.

Figure 4:
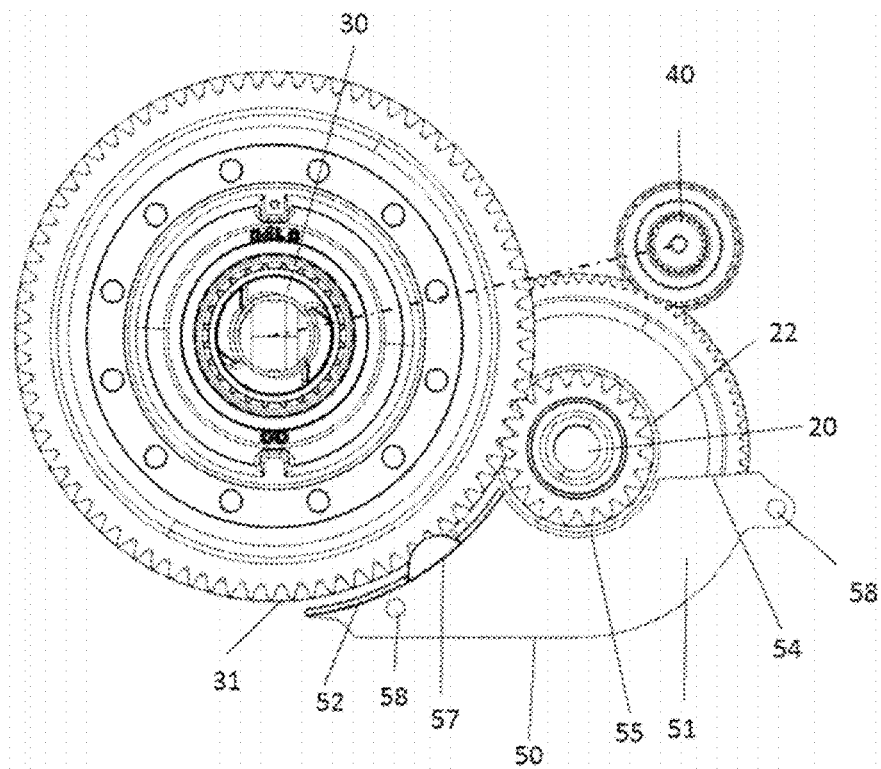
FIGS. 4 and 5 show the gearbox with the housing removed, viewed from different angles.
Figure 5:
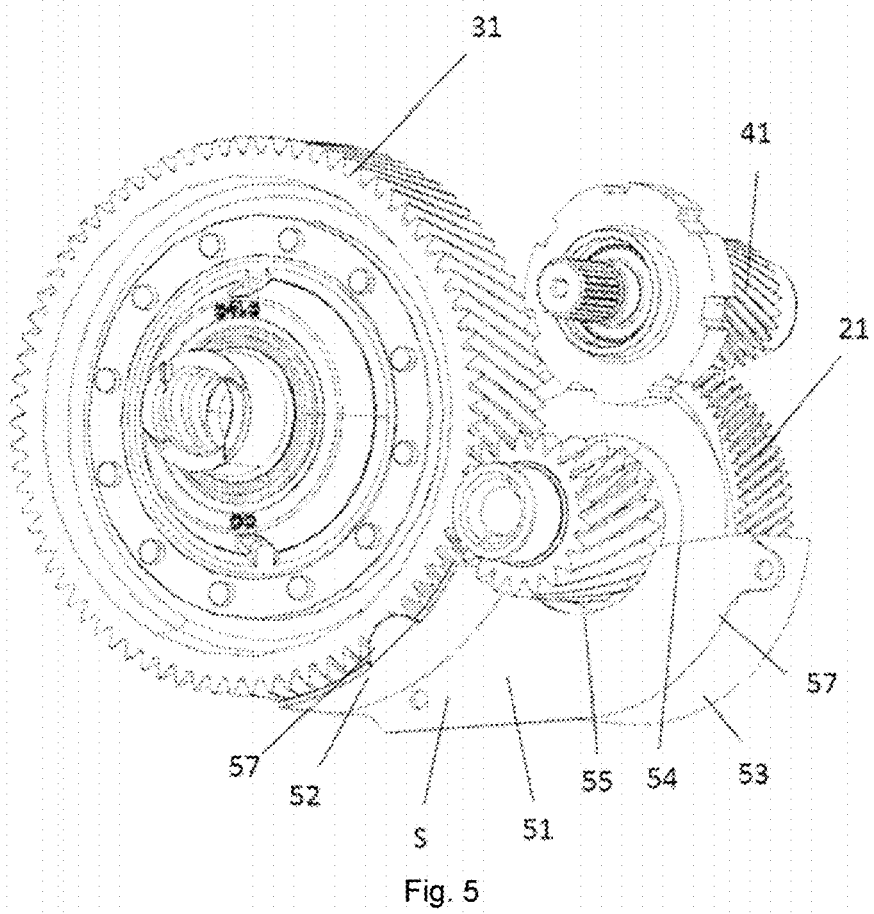

The relative positions in the vertical direction of the shafts in the gearbox 100 are constrained by the overall design of the vehicle. In the embodiment shown in FIG. 4, the centre of the third shaft 40 and the centre of the second shaft 30 are located above the first shaft 20. In particular, the centre of the first shaft 20 is arranged at a level below a line connecting the centre of the second shaft 30 and the centre of the third shaft 40. Referring to FIGS. 3 and 5, although the radius of the first large gear 21 of the first shaft 20 is significantly smaller than the radius of the second large gear 31 of the second shaft 30, the lowest part of the contour of the circumference of the first large gear 21 is at the same level as, or even lower than, the lowest part of the contour of the circumference of the second large gear 31.

During operation, the transmission components of the gearbox 100 are lubricated and/or cooled by lubricating oil. The lubricating oil then collects at the bottom of the housing 10, taking up a certain volume and forming a liquid surface of lubricating oil. Since the first large gear 21 and the second large gear 31 are both arranged in a lower part of the housing 10, the liquid surface of lubricating oil will submerge part of the lower half of both the first large gear 21 and the second large gear 31. Thus, in an operating state, the first large gear 21 and the second large gear 31 will agitate the lubricating oil that collects at the bottom of the housing 10 while rotating. This agitation will cause motive power of the gearbox 100 to be dissipated in the lubricating oil, resulting in loss of energy (i.e. oil agitation loss), and lowering the efficiency of motive power transmission in the gearbox 100. The oil agitation loss caused by the first large gear 21 and the second large gear 31 will accumulate, resulting in a considerable drop in the motive power transmission efficiency of the gearbox 100.

Figure 6:
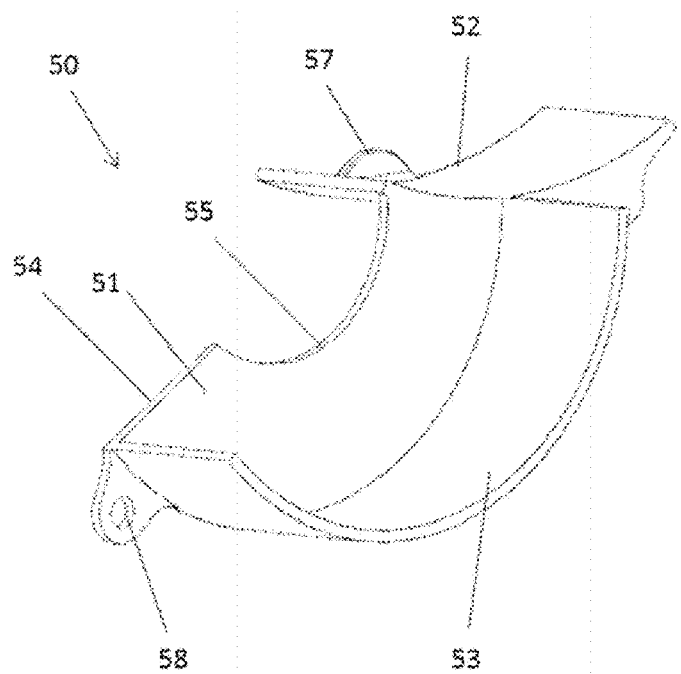
FIG. 6 shows a perspective view of an oil isolation plate according to an embodiment of the present disclosure.

To reduce such oil agitation loss, the gearbox 100 further comprises an oil isolation plate 50 which, together with the housing 10, forms a lubricating oil holding space S that is substantially isolated from the first large gear 21 and the second large gear 31. Referring to FIGS. 4-6, the oil isolation plate 50 comprises a main body plate 51 and a side extension part 52. The main body plate 51 is substantially perpendicular to the axial direction of the gearbox 100, and the side extension part 52 extends perpendicularly from a side of the main body plate 51 that is close to the second large gear 31. As shown in FIG. 5, the main body plate 51 is located between the first large gear 21 of the first shaft 20 and the lubricating oil holding space S in the axial direction. The side extension part 52 is located between the second large gear 31 of the second shaft 30 and the lubricating oil holding space S in a direction perpendicular to the axial direction, and the side extension part 52 has a contour along the circumference of the second large gear 31. That is to say, the first large gear 21 and the lubricating oil holding space S are offset with respect to each other in the axial direction, and isolated from each other by the main body plate 51 of the oil isolation plate 50. The second large gear 31 and the lubricating oil holding space S substantially coincide in the axial direction, and are isolated from each other by the side extension part 52 of the oil isolation plate 50.

The main body plate 51 extends upwards from the bottom of the housing 10; an upper edge 54 thereof is located above the lowest point of the circumference of the second small gear 22 of the first shaft 20, and below the position where the second small gear 22 meshes with the second large gear 31 of the second shaft 30. The upper edge 54 has a recess 55, the recess 55 having a contour along the circumference of the second small gear 22. As a result of such a structure, the main body plate 51 extends upwards from the bottom of the housing 10 as far as possible, increasing the volume of the lubricating oil holding space S, such that more lubricating oil can be accommodated, to ensure that lubricating oil does not overflow from the lubricating oil holding space S.

As shown in FIGS. 5 and 6, the oil isolation plate 50 may also have a bottom extension part 53, which extends perpendicularly from the bottom of the main body plate 51 and is inserted between the first large gear 21 of the first shaft 20 and the housing 10. The bottom extension part 53 has a contour along the circumference of the first large gear 21. Thus, the bottom extension part 53 can go around part of the circumference of the first large gear 21 from below, further isolating the first large gear 21 from the lubricating oil that collects at the bottom of the gearbox 100. The first large gear 21 has a relatively high rotation speed, so improving the isolation thereof can minimize the oil agitation loss of the gearbox 100.

During operation of the gearbox 100, lubricating oil enters the gearbox 100 by means of a lubricating oil introducing means (not shown), and lubricates and/or cools transmission components such as the first shaft 20, the second shaft 30, the third shaft 40, the first large gear 21, the second small gear 22, the second large gear 31 and the first small gear 41. In particular, lubricating oil that reaches the first large gear 21 and the second large gear 31 will splash out therefrom when the two gears rotate. Specifically, when the direction of travel of the vehicle is forwards, the gearbox 100 runs in a forward direction; viewed at the angle shown in FIG. 4, the first shaft 20 rotates anticlockwise, while the second shaft 30 and third shaft 40 rotate clockwise. Due to the clockwise rotation direction of the second large gear 31 and the axial position thereof coinciding with the lubricating oil holding space S, a large part of the lubricating oil splashing out from the second large gear 31 can fall into the lubricating oil holding space S directly from above.

Figures 7A, 7B:
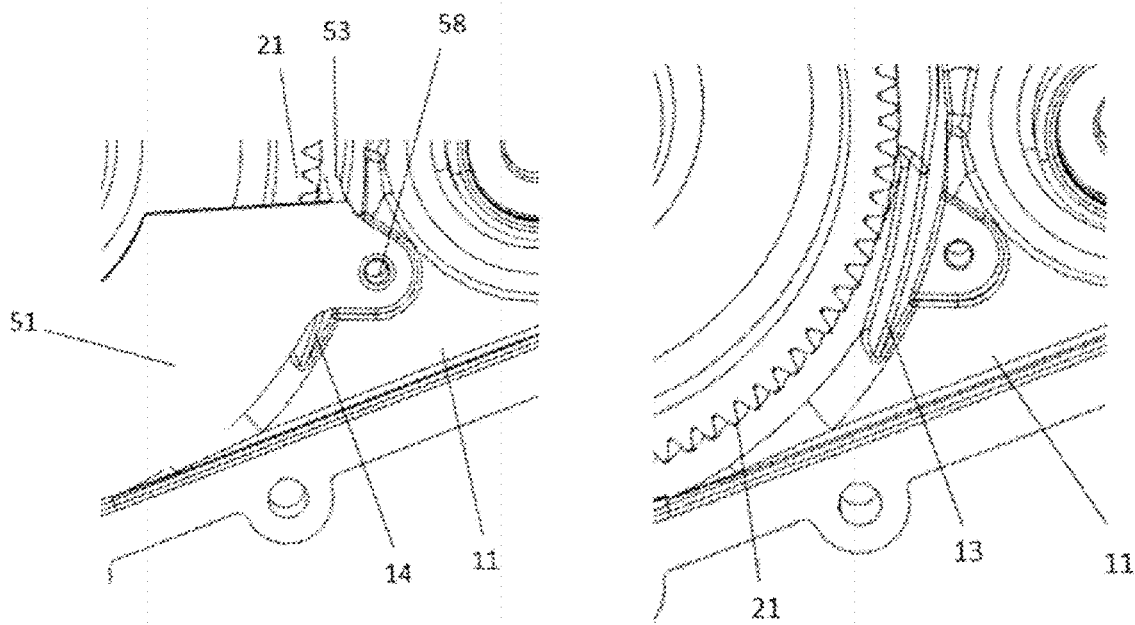
FIGS. 7A-7B show the oil guide groove of the gearbox.

On the other hand, the first large gear 21 is offset from the lubricating oil holding space S, and the lubricating oil splashing out from the first large gear 21 will fall onto the first half-housing 11 corresponding to the axial position thereof. Referring to FIGS. 7A-7B, a slope part 13 positioned close to the first large gear 21 is provided on the first half-housing 11, the slope part 13 facing towards the lubricating oil holding space S and sloping downwards. The slope part 13 cooperates with the bottom extension part 53 of the oil isolation plate 50 to form an oil guide groove 14 leading to the lubricating oil holding space S. Lubricating oil falling onto the first half-housing 11 is guided by the oil guide groove 14 into the lubricating oil holding space S.

Figure 8:
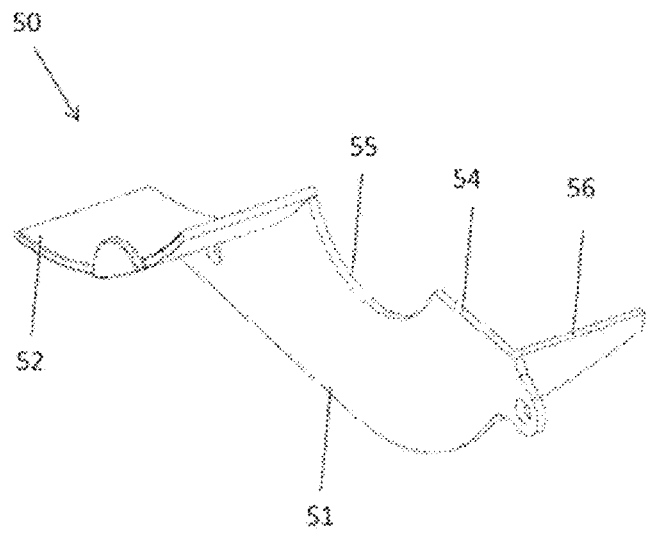
FIG. 8 shows a perspective view of an oil isolation plate according to another embodiment of the present disclosure.

In addition, as shown in FIG. 8, the oil isolation plate 50 may also have no bottom extension part. In this case, a protruding part 56 that protrudes perpendicularly may be provided on the main body plate 51; a downward-sloping edge of the protruding part 56 cooperates with the slope part 13 to form the oil guide groove 14.

With the structure described above, when the gearbox 100 is running in the forward direction, lubricating oil splashing out from the first large gear 21 and the second large gear 31 will collect in the lubricating oil holding space S, avoiding the risk of lubricating oil collecting outside the lubricating oil holding space S and being agitated by the first large gear 21 and second large gear 31. When the gearbox 100 is running in a reverse direction, the lubricating oil holding space S is less effective at collecting lubricating oil. However, reverse running of the gearbox corresponds to the vehicle reversing, which only accounts for a very small part of the operating state of the gearbox, so will not give rise to a perceptible oil agitation loss.

Figure 9A:
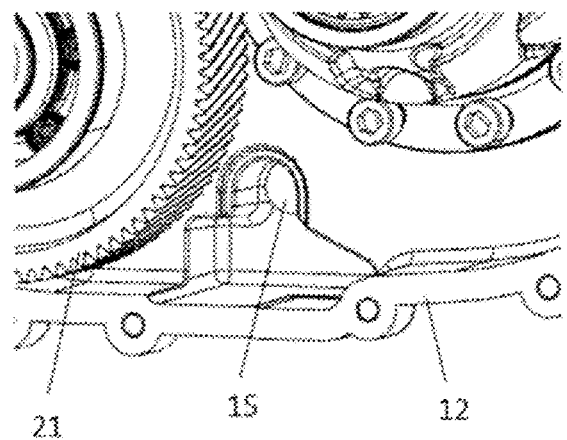
FIGS. 9A-9B show the filter mounting hole located on the second half-housing of the housing, and the blocking part of the oil isolation plate.
Figure 9B:
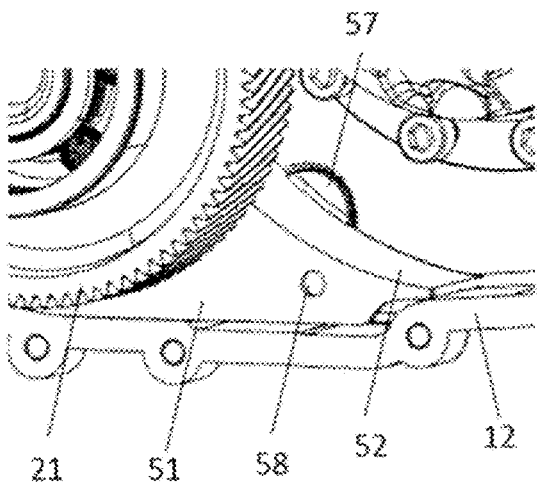

To achieve circulation of lubricating oil, referring to FIGS. 9A-9B, a filter mounting hole 15 for mounting a filter is provided on the second half-housing 12 of the gearbox 100. The filter mounting hole 15 leads to the lubricating oil holding space S. Lubricating oil is sucked out from the lubricating oil holding space S through the filter mounted in the filter mounting hole 15, and returns to the gearbox 100 after undergoing operations such as cooling. The filter can filter lubricating oil flowing therethrough. However, part of the contour of the filter mounting hole 15 goes beyond the side extension part 52 of the oil isolation plate 50, and is exposed to the second large gear 31 of the second shaft 30. To prevent lubricating oil flowing towards the filter mounting hole 15 from overflowing from the lubricating oil holding space S, and substantially isolate the filter mounting hole 15 from the second large gear 31, the oil isolation plate 50 is further provided with a blocking part 57 protruding parallel to the main body plate 51 from an axial edge of the side extension part 52, the blocking part 57 covering part of the filter mounting hole 15, and in particular the part that goes beyond the side extension part 52.

In addition, referring to FIG. 4, to fix the oil isolation plate 50 to the housing 10, the main body plate 51 is provided with two mounting holes 58. The oil isolation plate 50 is fixed to the first half-housing 11 by screws passing through the mounting holes 58.

According to another aspect of the present disclosure, an electric drive assembly system is proposed, comprising the gearbox 100 described above.

According to another aspect of the present disclosure, a vehicle is proposed, comprising the electric drive assembly system described above.

The vehicle may be a conventional fuel vehicle, a plug-in hybrid electric vehicle, a battery electric vehicle, or another type of vehicle. Based on the above, the vehicle can realize the functions of the gearbox described above and has the advantages described above.

Certain features, structures or characteristics in one or more embodiments of the present disclosure may be combined appropriately.

The above is a description of the present disclosure, and should not be regarded as limiting it. Although some exemplary embodiments of the present disclosure have been described, those skilled in the art will readily understand that many modifications could be made to the exemplary embodiments without departing from the original teaching and advantages of the present disclosure. Therefore, all such modifications are intended to be included in the scope of the present disclosure as defined by the claims. It should be understood that the above is a description of the present disclosure, and the present disclosure should not be regarded as being limited to the specific embodiments disclosed; moreover, modifications to the disclosed embodiments and other embodiments are intended to be included in the scope of the present disclosure.

The invention claimed is:

1. A gearbox, comprising:
a housing;
a first shaft, accommodated in the housing and having a first large gear, the first shaft rotating about a first rotation axis, the first rotation axis being substantially parallel to an axial direction of the gearbox;
a second shaft, accommodated in the housing and having a second large gear, the second shaft rotating about a second rotation axis, the second rotation axis being substantially parallel to the axial direction of the gearbox;
an oil isolation plate which, together with the housing, forms a lubricating oil holding space, the lubricating oil holding space being substantially isolated from the first large gear and the second large gear;
a third shaft accommodated in the housing and having a first small gear, the third shaft rotating about a third rotation axis, the third rotation axis being substantially parallel to the axial direction of the gearbox,
wherein the first shaft further has a second small gear, the second small gear being rotationally fixed to the first large gear and offset with respect thereto in the axial direction, the first small gear is meshed with the first large gear, the second small gear is meshed with the second large gear, and
wherein the centre of the first shaft is arranged at a level below a line connecting the centre of the second shaft and the centre of the third shaft,
wherein the oil isolation plate has a main body plate and a side extension part, the main body plate being substantially perpendicular to the axial direction of the gearbox, the main body plate isolating the lubricating oil holding space from the first large gear, the side extension part extending perpendicularly from a side of the main body plate that is close to the second large gear, and isolating the lubricating oil holding space from the second large gear,
wherein the housing comprises a first half-housing and a second half-housing fitted together, the first half-housing being close to the first large gear in the axial direction, and the second half-housing being close to the second large gear in the axial direction, and
wherein the second half-housing further comprises a filter mounting hole for mounting a filter, and the oil isolation plate further comprises a blocking part protruding parallel to the main body plate from an axial edge of the side extension part, the blocking part covering part of the filter mounting hole, so as to substantially isolate the filter mounting hole from the second large gear.

2. The gearbox according to claim 1, wherein the oil isolation plate further has a bottom extension part, which extends perpendicularly from the bottom of the main body plate and is inserted between the first large gear and the housing.

3. The gearbox according to claim 2, wherein
the bottom extension part has a contour along the circumference of the first large gear; and
the side extension part has a contour along the circumference of the second large gear.

4. The gearbox according to claim 2, wherein
the first half-housing has a slope part positioned close to the first large gear, the slope part sloping downwards towards the lubricating oil holding space, and the oil isolation plate further has a bottom extension part, which extends perpendicularly from the bottom of the main body plate and is inserted between the first large gear and the housing, the bottom extension part cooperating with the slope part to form an oil guide groove leading to the lubricating oil holding space.

5. The gearbox according to claim 4, wherein
when the gearbox is running in a forward direction, at least a portion of lubricating oil splashing out from the first large gear of the first shaft falls onto the first half-housing, and is guided by the oil guide groove into the lubricating oil holding space, and
when the gearbox is running in the forward direction, at least a portion of lubricating oil splashing out from the second large gear of the second shaft falls into the lubricating oil holding space.

6. The gearbox according to claim 1, wherein
an upper edge of the main body plate is located above the lowest point of the circumference of the second small gear, and below a position where the second small gear meshes with the second large gear.

7. The gearbox according to claim 6, wherein
the upper edge of the main body plate has a recess, the recess having a contour along the circumference of the second small gear.

8. The gearbox according to claim 1, wherein
the first large gear of the first shaft and the lubricating oil holding space are offset with respect to each other in the axial direction, and isolated from each other by the main body plate of the oil isolation plate, and
the second large gear of the second shaft and the lubricating oil holding space substantially coincide in the axial direction, and are isolated from each other by the side extension part of the oil isolation plate.

9. The gearbox according to claim 1, wherein
the first half-housing has a slope part positioned close to the first large gear, the slope part sloping downwards towards the lubricating oil holding space, and the oil isolation plate further comprises a protruding part which protrudes perpendicularly from the main body plate, the protruding part cooperating with the slope part to form an oil guide groove leading to the lubricating oil holding space.

10. The gearbox according to claim 9, wherein
when the gearbox is running in a forward direction, at least a portion of lubricating oil splashing out from the first large gear of the first shaft falls onto the first half-housing, and is guided by the oil guide groove into the lubricating oil holding space, and
when the gearbox is running in the forward direction, at least a portion of lubricating oil splashing out from the second large gear of the second shaft falls into the lubricating oil holding space.

11. An electric drive assembly system comprising the gearbox according to claim 1.

12. A vehicle comprising the electric drive assembly system according to claim 11.

* * * * *